(12) United States Patent
Morozov et al.

(10) Patent No.: US 6,836,349 B2
(45) Date of Patent: Dec. 28, 2004

(54) OPTICAL PERFORMANCE MONITORING DEVICE

(75) Inventors: Valentine N. Morozov, San Jose, CA (US); Tokuyuki Honda, Sunnyvale, CA (US); Long Yang, Union City, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/313,350

(22) Filed: Dec. 6, 2002

(65) Prior Publication Data

US 2003/0123119 A1 Jul. 3, 2003

Related U.S. Application Data

(60) Provisional application No. 60/337,960, filed on Dec. 7, 2001.

(51) Int. Cl.[7] .............................................. G02B 26/08
(52) U.S. Cl. ...................................... 359/212; 250/234
(58) Field of Search ................................ 359/212, 213, 359/214; 250/234; 356/71

(56) References Cited

U.S. PATENT DOCUMENTS 4,796,997 A * 1/1989 Svetkoff et al. ............ 356/608
5,247,384 A    9/1993 Inoue et al. ................. 359/199
6,075,647 A    6/2000 Braun et al. ................. 359/578
6,118,530 A    9/2000 Bouevitch et al. .......... 356/308
6,396,603 B1   5/2002 Kim ............................ 359/133
6,441,933 B1   8/2002 Jang ............................ 359/124
6,473,165 B1 * 10/2002 Coombs et al. ................ 356/71

* cited by examiner

Primary Examiner—Euncha Cherry
(74) Attorney, Agent, or Firm—Allen, Dyer, Doppelt, Milbrath & Gilchrist, P.A.

(57) ABSTRACT

Optical performance monitoring device for monitoring and analyzing an optical signal has a periodically movable reflective mirror to receive an input optical beam and to cyclically "scan" (deflect) the beam in a one-dimensional direction. The deflected beam at a varying deflection angle is directed to a linear variable filter (LVF) that passes a selected wavelength channel of the deflected beam in dependence upon the deflection angle. The selected channel is then passed to a photodetector via a focusing lens, typically a cylindrical lens. The device is durable, tunable, offers low loss, good wavelength registrability and spectral resolution.

10 Claims, 6 Drawing Sheets

OPTICAL PERFORMANCE MONITORING DEVICE

RELATED APPLICATIONS

This application claims priority from U.S. provisional application No. 60/337,960 filed Dec. 7, 2001.

TECHNICAL FIELD

This invention relates generally to signal monitoring devices for optical telecommunication networks, capable of detecting and measuring at least the power, or intensity, and preferably optical signal-to-noise ratio of each of a plurality of WDM channels transmitted over an optical waveguide, and particularly to such device employing a light deflector, a linear variable filter (LVF) and a photodetector.

BACKGROUND ART

One of the functions of a known optical performance monitor (OPM) is to identify and measure the power in each channel of a wavelength division multiplexed (WDM) signal. Some OPMs, as for example OPM512, a 50 GHz, 512 pixel monitor available from Ocean Optics, USA, are also capable of measuring the optical signal-to-noise ratio (OSNR) of multiple wavelength channels. OPMs without such capability are sometimes referred to as optical channel monitors (OCM).

U.S. Pat. Nos. 6,396,603 (Samsung Electronics) and 6,441,933 (LG Electronics) describe two exemplary devices for monitoring the performance of optical channels in telecommunication networks.

U.S. Pat. No. 6,075,647 (Hewlett-Packard) describes an optical spectrum analyzer including a polarization modifier that serves to eliminate polarization dependence of the input signal to be analyzed. The modified signal is then directed to a tiltable interference filter.

U.S. Pat. No. 6,118,530 discloses an optical scanning spectrometer utilizing a fixed fiber F-P filter in combination with a Fabry-Perot grating.

It is an object of the present invention to provide a compact optical performance monitoring device. It is also an object of the invention to provide such device that is durable, tunable, offers low loss, good wavelength registrability and spectral resolution.

SUMMARY OF THE INVENTION

In accordance with one aspect of the invention, there is provided an optical performance monitoring device for monitoring and analyzing the spectral properties of an optical signal in an input optical beam, the device comprising:

an optical deflecting means having a periodically movable reflective mirror coupled to receive the input optical beam and to deflect the beam in a one-dimensional direction to produce a deflected beam at a varying deflection angle, a photodetector disposed to receive the deflected beam from the scanning means, and a linear variable filter (LVF) disposed in the optical path of the deflected beam to pass a selected wavelength channel of the deflected beam in dependence upon the deflection angle.

The device may also comprise a focusing lens disposed to receive the deflected beam from the deflecting means and to direct the beam to the LVF at an approximately normal incidence angle. Advantageously, the focusing lens may also bring the deflected beam into a focus at the LVF.

In an embodiment of the invention, the LVF is fixed and the deflected light beam is moved relative thereto so as to be incident on various spots of the filter as the beam is deflected by the movable mirror.

It is also conceivable to move the LVF relative to a non-deflected optical beam in the absence of a movable mirror (as described in a co-pending U.S. patent application Ser. No. 10/059,413, the specification of which being incorporated by reference therewith), but such solution, requiring relatively fast filter displacement and control means, is somewhat inferior to the solution proposed by the present invention.

BRIEF DESCRIPTION OF THE DRAWINGS

Exemplary, non-limiting embodiments of the invention will now be described in more detail in conjunction with the drawings in which.

DETAILED DESCRIPTION OF THE EMBODIMENTS OF THE INVENTION

Figure 1:
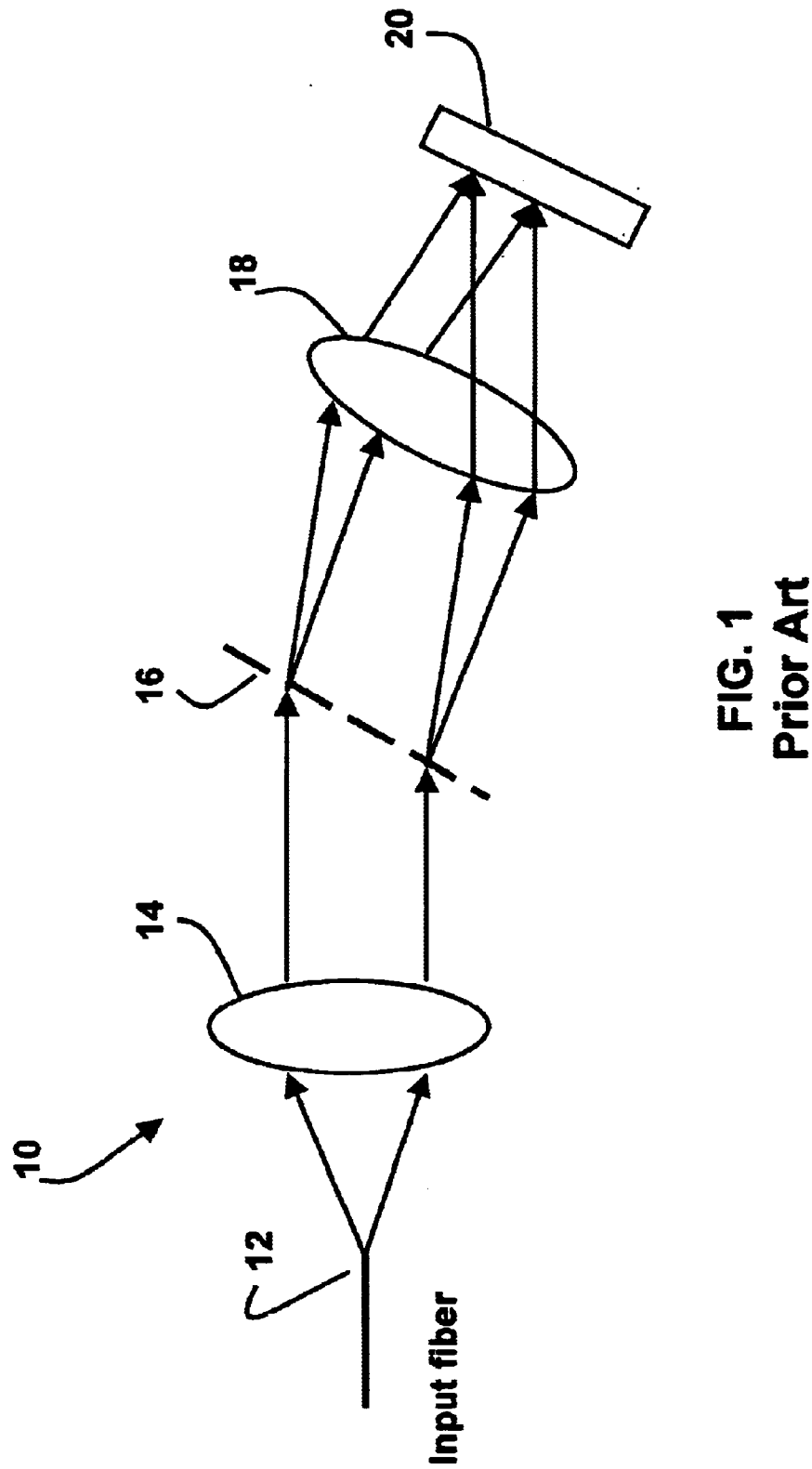
FIG. 1 illustrates schematically a prior art optical monitoring device.

Turning now to FIG. 1, a conventional OPM 10 has an input port 12 coupled with a collimating lens 14. A collimated input beam from the lens 14 is directed to a fixed diffraction grating 16. After being diffracted by the grating 16, the beam is separated into numerous sub-beams differing by a certain wavelength increment. The sub-beams propagate at slightly different angles in a plane perpendicular to the grooves of the grating. A focusing lens 18 focuses these sub-beams onto the surface of a linear photodetector array 20.

The spatially separated focused wavelength channel beams are incident on different photodetector cells and, thereby, generate independent signals for each wavelength channel. The amplitude of each electrical signal is proportional to the light intensity illuminating given cell. An InGaAs photodetector is normally used for communication systems operating in the 1300 to 1600 nm spectrum range. Commercial InGaAs photodetector arrays are available with 128, 256, and 512 photodetector elements with either 25 or 50 microns spacing between detector cells.

High cell count photodetector array is expensive, requires a TEC (thermo-electric cooler) for efficient operation, and usually has more noise current compared to pin InGaAs detectors. It is advantageous to use a single detector because of better performance and lower cost. In such a case, information about the optical power, wavelength and optical signal-to-noise ratio of each wavelength signal channel can be obtained sequentially by scanning the spectra of all signals over the single detector.

A number of scanning devices is known to date, including resonant optical scanners. The fixed frequency resonant optical scanner is an electromagnetically driven moving mirror device that deflects a light beam with a sinusoidal motion. The mirror assembly is attached at the center of either a torsion spring or a flexure. The scanning frequency range is typically from 5 Hz to 1.5 KHz, fixed at any one value within the range. The scan angle is inversely proportional to the frequency, and is a function of the mirror size. Operation at the resonant frequency is sustained by a feedback amplifier, and the driver controls the mirror angle and provides a reference signal. High quality factor Q of the device insures frequency stability, low reaction forces and low electrical drive power. High flexural stiffness provides good resistance to shock and vibration, as well as a low wobble and good amplitude stability. The resonant optical scanners provide a consistently repeatable performance, because there are no bearings or wearing parts, as in rotary and linear scanners. Optical resonant scanners are manufactured, for example, by Electro-Optical Products Corp., N.Y. 11365, Nutfield Technology, NH 03087, Lasesys Corporation, CA 95407.

A resonant optical scanner is described, by way of example, in U.S. Pat. No. 5,247,384 to Fuji Photo Film Co., Ltd. The specification of the patent is hereby incorporated by reference.

Figure 2:
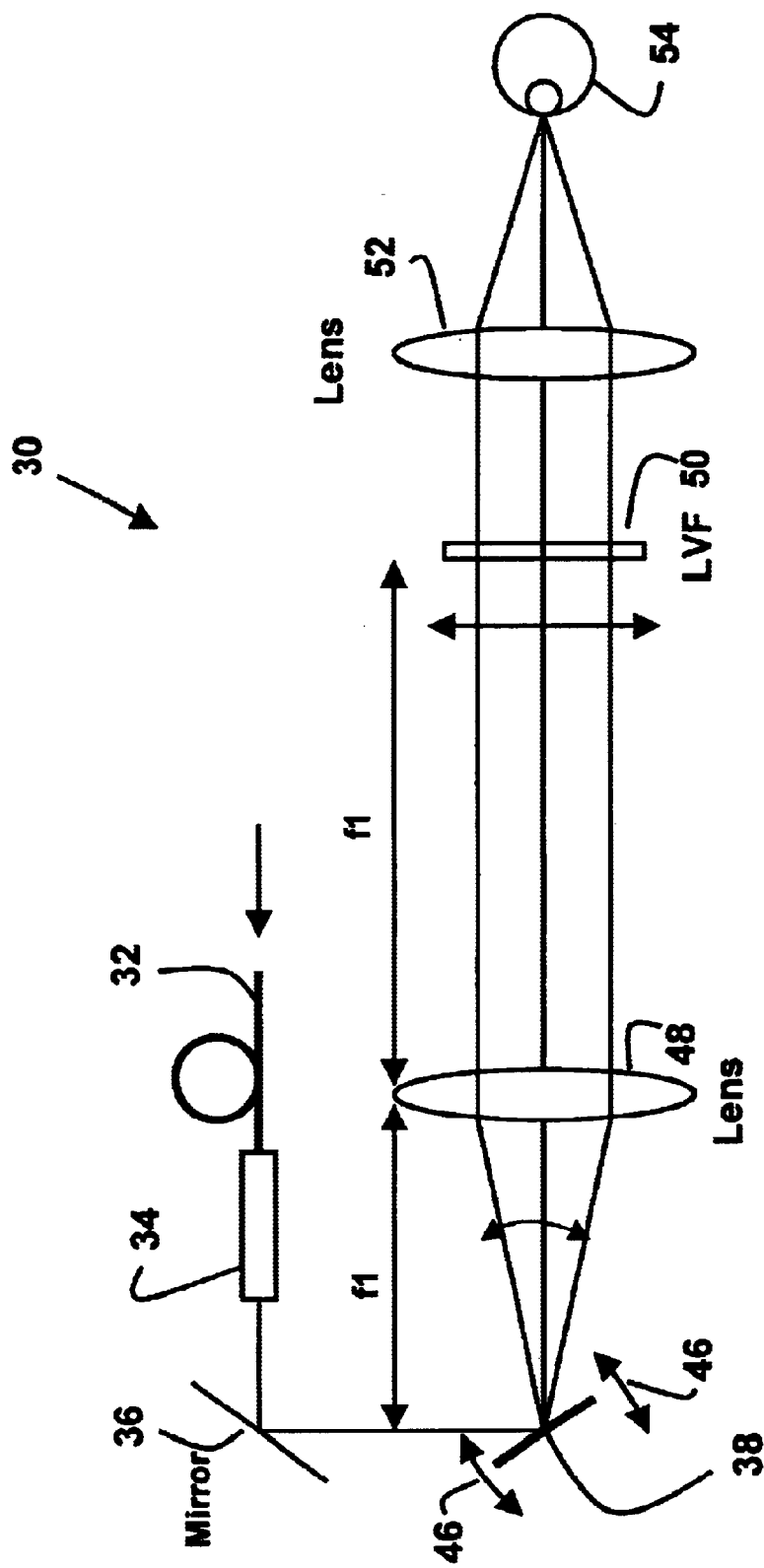
FIG. 2 shows one embodiment of the device of the invention.

Turning now to FIG. 2, an exemplary basic configuration of the optical monitoring device of the invention, generally designated at 30 has an input fiber 32 coupled with a collimating lens 34. A mirror 36 is provided to direct a collimated beam of light from the collimator 34 to a deflecting ("scanning") mirror 38 that is attached to a resonant drive for cyclically pivoting the mirror in a plane denoted by the two arrows 46.

A collimating (spherical or cylindrical) lens 48 is disposed at a focal length Fl from the mirror 38 (more specifically, from the point of incidence of the optical beam onto the mirror 38). The mirror drive (not shown) is adjusted such that the deflection angle does not exceed the operating dimension (diameter) of the lens 48. A linear variable filter (LVF) 50 is disposed in the path of the light collimated by the lens 48 at a specific distance discussed in more detail below.

The LVF is fixed, whereby the light beam periodically deflected by the mirror 38 strikes the LVF at different positions corresponding to different wavelengths of light transmitted by the LVF 50. The transmitted light is focussed by means of a focusing lens 52 onto a fixed single photodetector, e.g. an InGaAs photodetector 54 disposed at the focal point of the focusing lens 52.

Linear variable filters (LVFs) are dielectric thin film filters similar to more commonly used DWDM filters. A typical DWDM filter is a bandpass filter which allows light in a certain wavelength region, or channel, to be transmitted and rejects all other wavelengths within a specified broader wavelength region. These filters are generally etalon or Fabry-Perot cavity based in construction. A dielectric reflective layer is deposited on a substrate followed by a cavity layer and another reflective layer. This forms an etalon where the cavity layer thickness determines the center wavelength of the filter and the reflectivity of the layers determines the filter bandwidth. In order to produce a narrower filter with better out of band rejection, more cavities are added on top of the initial cavity. Of course, in order for multiple cavities to produce a narrower filter the cavity layers should have substantially the same thickness.

Figure 3:
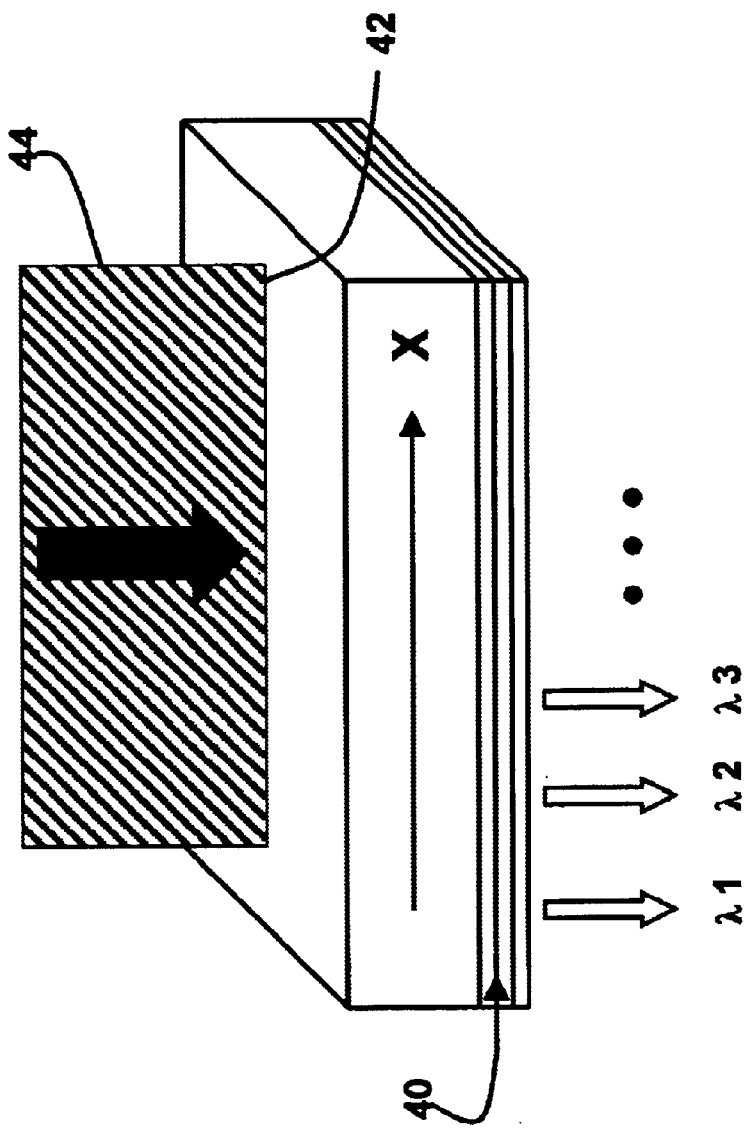
FIG. 3 illustrates schematically a conventional linear variable filter.

Linear variable filters, like one shown in FIG. 3, have wedged layers 40, the wedges having the effect of changing the central wavelength of the filter dependent on the position of the filter in a direction X. This has the effect of shifting the filter center wavelength along the wedge axis parallel to X. As with DWDM filters, multiple wedged layers can be stacked on one another. An incident beam of light is directed into the filter in a plane 44 along a longitudinal axis 42 of the filter. The position of the beam is periodically varied such that the beam "scans" periodically the length of the filter along the axis 42.

A LVF 40 can thus be tuned to different wavelengths by translating the incident beam relative to the filter (by moving either the beam of the filter) in the linearly varying filter direction represented by the line 42.

In operation of the device of FIG. 2, a multi-wavelength light beam from the input fiber 32 is deflected by the cyclically pivotable mirror 38 onto different spots of the LVF 52. A specific wavelength channel, corresponding to a temporary spot of the incident beam on the LVF, is directed into the photodetector 54 to measure the optical power at that channel.

It can be seen that in the embodiment of FIG. 2, the size of a spot defined on the LVF 50 by a specific deflected beam from deflecting mirror 38 is defined by the properties of the collimating lens 48. The lens 48 produces a "parallel" beam resulting in an approximately circular spot on the LVF, the diameter of the spot determining the width of the wavelength channel detected. As described below, it is advantageous and possible to reduce at least one dimension of the spot. The lens 48 is preferably designed to focus the beam onto the LVF thus minimizing the spot diameter.

The main advantage of the arrangement of FIG. 2 is the simplicity of focusing the beam directly onto the photodetector without the need to recouple the beam into a fiber.

A further improvement of the basic concept of the device of FIG. 2 is offered by providing a double-pass of the input beam through a LVF. Such an arrangement, requiring a reflecting means, is schematically represented in FIG. 4.

An input beam is directed through a port 60 of a circulator 62 to a collimator 64. The collimated beam is passed into a cyclical deflecting mirror 38. The mirror produces deflected beams in varying one-dimensional direction defining essentially a single plane. A focusing cylindrical lens 66 is disposed in the path of the deflected beams along the one-dimensional direction (i.e. coextensively with the single plane), and such that it focuses the light beams passing therethrough onto a LVF 68 coupled with a mirror 70 that is disposed on a substrate 72.

As in the embodiment of FIG. 2, a light beam passed through a specific spot on the LVF corresponds to a predetermined wavelength channel (of a narrow wavelength range). However, the light beam is now reflected from the mirror 70 and returned through practically the same LVF spot, through the focusing lens 66, via the mirror 38 and collimator 64 to the circulator 62 where it exits through an output port 69 to a photodetector 54. The double pass of the light beam through LVF serves to narrow the spectral response of the filter. In practice, a 25 GHz filter bandwidth is feasible which enables OSNR measurements by the photodetector for 50 GHz channel spacing.

Figure 4:
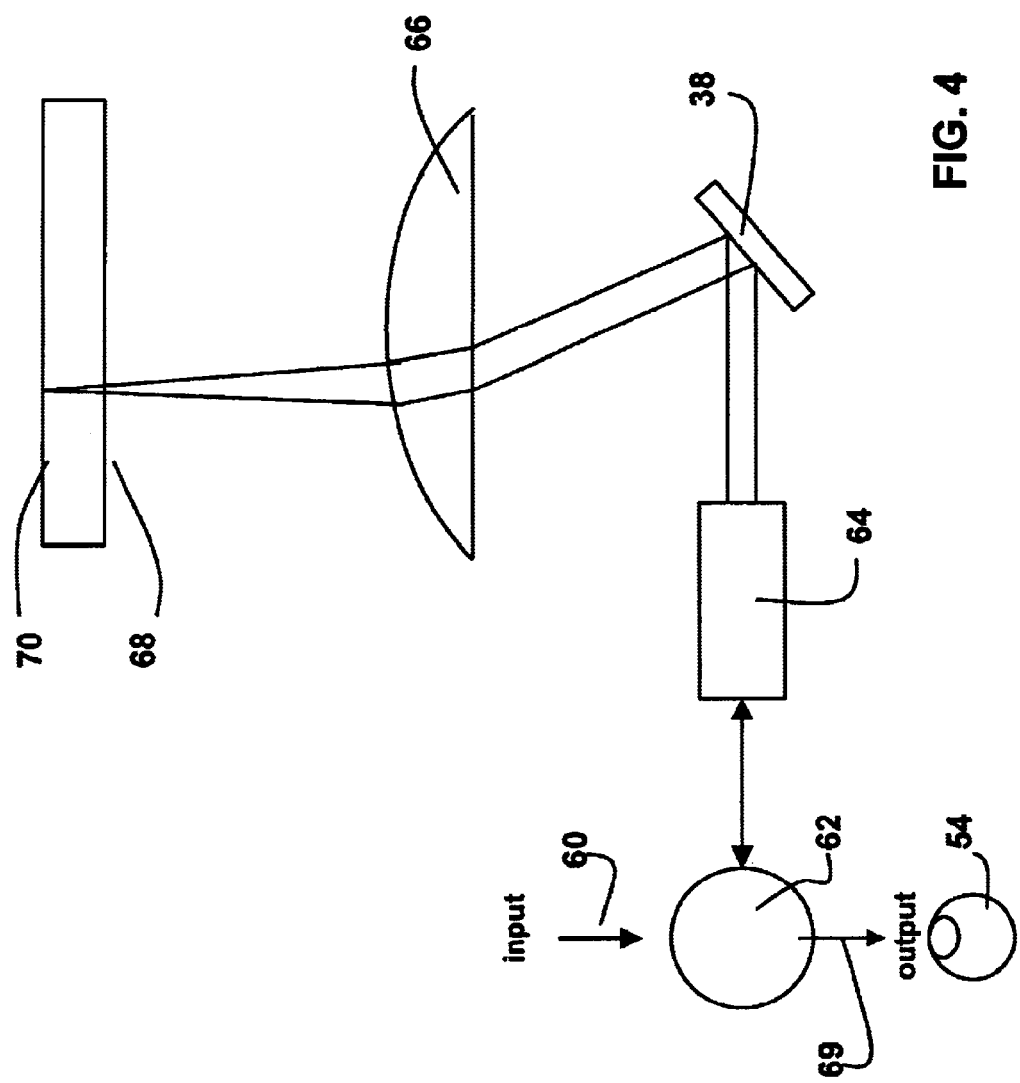
FIG. 4 illustrates partially an alternative arrangement of the device of the invention.

Exemplary dimensions in the embodiment of FIG. 4 are as follows:

| | |
|---|---|
| Focal length of lens 66 | 15 mm |
| Diameter of lens 66 and LVF | 15 mm |
| Collimated beam diameter | ~400 μm |
| Focused beam diameter | ~65 μm |
| Total angular tuning range of tilting mirror 38 | ~50° |

Figure 5:
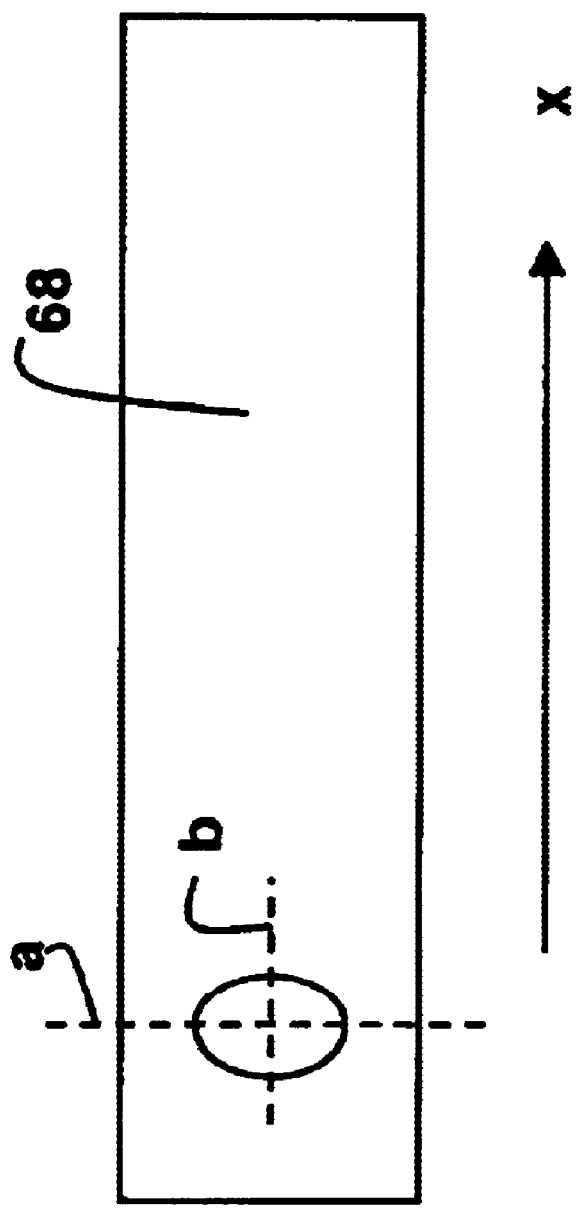
FIG. 5 shows a schematic view of an elliptical light beam incident on the LVF with its major axis in the wavelength constant axis of the LVF and its minor axis in the wavelength varying direction of the LVF.

The choice of a cylindrical lens as collimating lens 66 (FIG. 4) is dictated by the cylindrical lens producing an elliptical beam spot, rather a circular spot, on the filter 68. The cylindrical lens which is shown in cross-section in FIG. 4 is disposed such that its curvature extends in the direction of tilt (46) of the mirror 38. This has the advantage of extending the spot in a direction perpendicular to the longitudinal axis X of LVF. FIG. 5 shows a schematic view of an elliptical light beam incident on a LVF 68 with its major axis a in the wavelength-constant axis of the LVF and its minor axis b in the wavelength varying direction X of the LVF. The benefits of the elliptical beam geometry are discussed in the co-pending U.S. patent application Ser. No. 10/059,413, supra.

In contrast to the embodiment of FIG. 2, the positioning of the focusing lens 66 before the LVF 50 rather than behind it (as lens 52) enables a reduction of the spot size (b) in a direction X as shown in FIG. 5 thus reducing the wavelength channel width.

It is further known that linear variable filters, similarly as most interference filters, are angle-sensitive and polarization-sensitive. The angle-sensitivity dictates that the LVF be positioned as close to perpendicular relative to the incident beams from the lens 66. Moreover, the beam spot on the LVF (FIG. 5) should preferably be of the same size regardless of the position X. This imposes certain design requirements on the lens 66, requirements familiar to those skilled in optics.

Figure 4A:
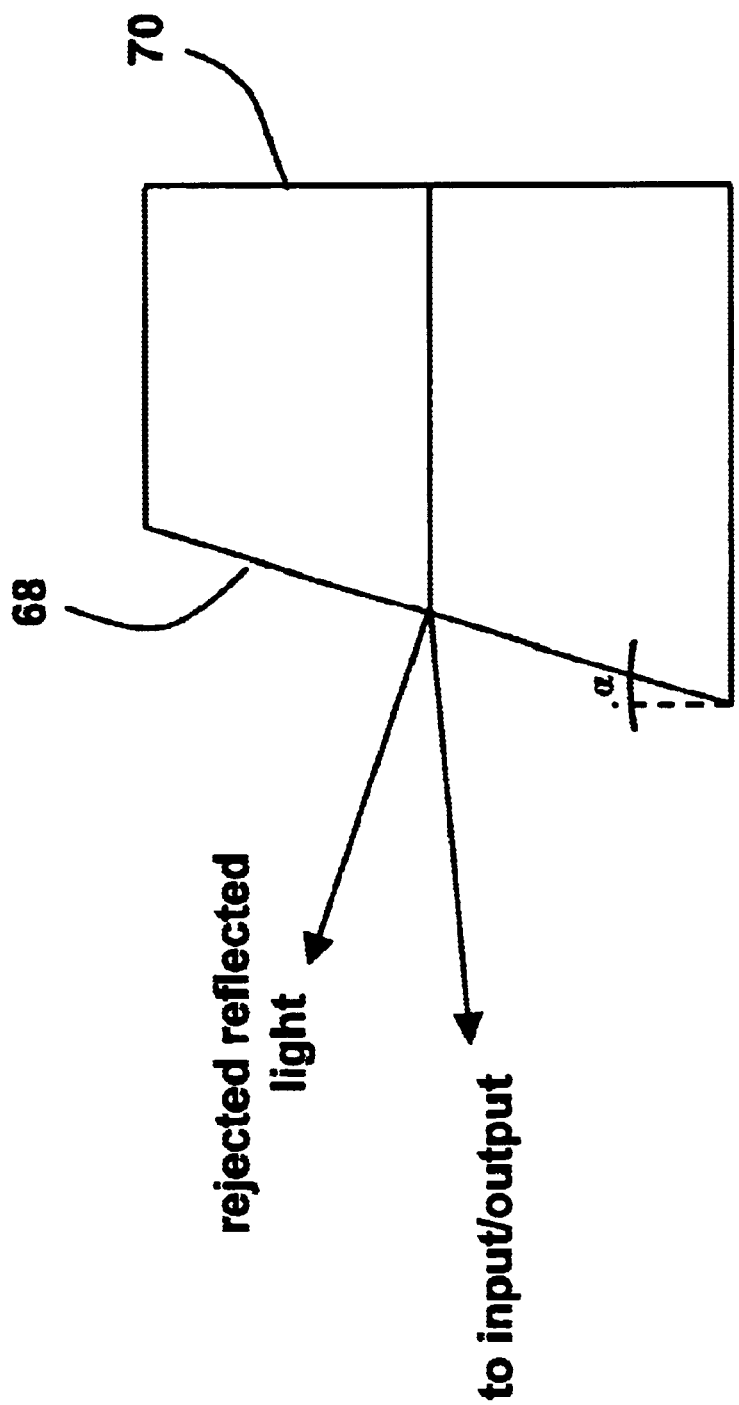
FIG. 4a illustrates the positioning of the linear variable filter (LVF) relative to an incident beam.

On the other hand, the front surface of the LVF 68 has a certain reflectivity which is undesirable in this case as the light reflected front surface of LVF 68 interferes with light double-passed through LVF. It is therefore preferable to tilt the LVF at an angle α (FIG. 4a), sufficient to safeguard the passage of double-passed beams through the above-explained return path to the output port 69 and to the photodetector 54, but also effective to deflect the light reflected from the front surface of LVF away from the return path ("rejected reflected light").

What is claimed is:

1. An optical performance monitoring device for monitoring and analyzing the spectral properties of an optical signal in an input optical beam, the device comprising:

an optical deflecting means having a periodically movable reflective mirror coupled to receive the input optical beam and to deflect the beam in a one-dimensional direction to produce a deflected beam at a varying deflection angle, a photodetector disposed to receive the deflected beam from the optical deflecting means, and a linear variable filter (LVF) disposed in the optical path of the deflected beam for receiving the optical beam at various positions therealong as the optical deflecting means is moved to pass a selected wavelength channel beam of the deflected beam in dependence upon the deflection angle.

2. The monitoring device of claim 1 wherein the LVF is disposed such that the deflected light beam is moved relative thereto so as to be incident on various spots of the filter in the one-dimensional direction as the beam is deflected by the movable mirror.

3. The device of claim 1 further comprising a reflecting means coupled with the LVF for reflecting light passed through the LVF to effect a double pass of the deflected beams.

4. The device of claim 3 further comprising a focusing means for focusing a deflected beam from the deflecting means on the LVF.

5. The device of claim 4 wherein the focusing means is a cylindrical lens disposed for directing the deflected beam to the LVF at an approximately normal incidence angle.

6. The device of claim 3, further comprising a circulator having an input port, a second port and an output port and coupled such that the input port is coupled for receiving an input light signal to be detected, the second port is coupled for passing the input signal to the LVF and the output port is for receiving a light beam double-passed through the LVF.

7. A method for monitoring and analyzing the spectral properties of an optical signal in an input optical beam, the method comprising:

cyclically deflecting the input optical beam in a one-dimensional direction onto a linear variable filter disposed along the direction to produce transmitted light beams with specific wavelength channels corresponding to temporary spots of the input beam on the linear variable filter, and detecting optical power of the specific wavelength channels.

8. The method of claim 7 further comprising the step of focusing the transmitted light beams on the linear variable filter.

9. The method of claim 8 wherein the focusing is effected using a cylindrical lens.

10. The method of claim 7 further comprising the step of reflecting the transmitted light beam for a double pass through the linear variable filter before the step of detecting the optical power.

* * * * *